United States Patent
Furuki et al.

[19]

[11] Patent Number: 5,995,314
[45] Date of Patent: Nov. 30, 1999

[54] INDEX SIGNAL GENERATING CIRCUIT

[75] Inventors: Shigeru Furuki; Mikio Sekine, both of Fukushima-ken, Japan

[73] Assignee: Alps Electric Co. Ltd., Tokyo, Japan

[21] Appl. No.: 08/864,595

[22] Filed: May 28, 1997

[30] Foreign Application Priority Data

Jun. 4, 1996 [JP] Japan .................................. 8-141786

[51] Int. Cl.⁶ .................................................. G11B 19/06
[52] U.S. Cl. ........................ 360/73.03; 318/254; 318/560
[58] Field of Search ................................... 318/138, 254, 318/439, 560, 561; 360/73.03, 73.02, 98.7, 99.04, 99.08

[56] References Cited

U.S. PATENT DOCUMENTS

| | | |
|---|---|---|
| 4,430,603 | 2/1984 | Muller . |
| 4,651,241 | 3/1987 | von der Heide et al. ................. 360/97 |
| 5,408,153 | 4/1995 | Imai et al. .............................. 318/560 |

FOREIGN PATENT DOCUMENTS

| | | |
|---|---|---|
| 3421 487 A1 | 12/1985 | Germany . |
| 42 18 674 A1 | 6/1992 | Germany . |
| 61-99970 | 5/1986 | Japan . |
| 62-137763 | 6/1987 | Japan . |

*Primary Examiner*—Thang V. Tran
*Attorney, Agent, or Firm*—Brinks Hofer Gilson & Lione

[57] ABSTRACT

An index signal generating circuit for generating a precise index signal free from time shifting even under ambient temperature changes. An index signal generating circuit includes a magnet attached onto the circumference of the rotor of a spindle motor, a magnetic flux detecting device for detecting magnetic flux of the magnet when the magnet moves past the magnetic flux detecting device, a Hall effect device for switching a current in the driving coil of the spindle motor, a first waveform shaping circuit for shaping the detected output of the magnetic flux detecting device into a rectangular-wave signal, a second waveform shaping circuit for shaping the output of the Hall effect device into a rectangular-wave signal, and a logic circuit for ANDing the output rectangular-wave signals from the first and second waveform shaping circuits, wherein an index signal is generated at the timing of a transition of the AND output of the logic circuit.

1 Claim, 10 Drawing Sheets

FIG. 7
(a) INPUT TO COMPARATOR 12
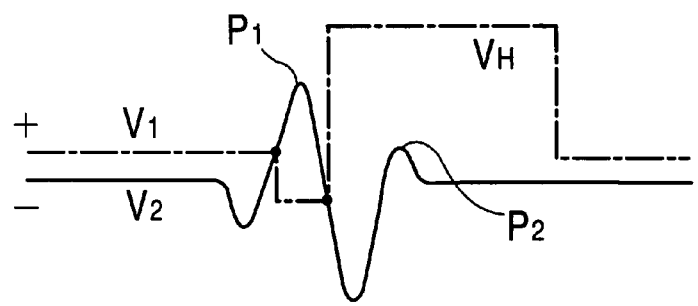
(b) OUTPUT FROM COMPARATOR 12
(c) OUTPUT FROM MONOSTABLE MULTIVIBRATOR 15
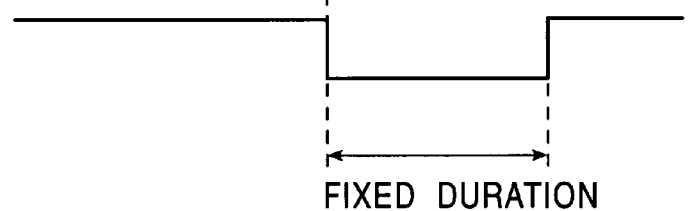
FIXED DURATION

FIG. 9

(a) OUTPUT FROM HALL EFFECT DEVICE 4-3

(b) OUTPUT FROM WAVEFROM SHAPING CIRCUIT 10

(c) INPUT TO COMPARATOR 12

(d) OUTPUT FROM COMPARATOR 12

TRIGGERING EDGE

INDEX SIGNAL GENERATING CIRCUIT

BACKGROUND OF THE INVENTION

1. Field of the Invention

The present invention relates to an index signal generating circuit and, more particularly, to an index signal generating circuit that generates an index signal responsive to the rotational condition of a spindle motor which is driven to rotate a rotating recording medium such as a floppy disk.

2. Description of the Related Art

Recording and reproducing apparatuses that record and reproduce information using a disk recording medium typically employ a spindle motor to rotate the disk recording medium, and along with it, an index signal generating circuit to generate an index signal indicative of the rotational condition of the spindle motor.

FIG. 10 is a block diagram showing an exemplary conventional index signal generating circuit, and FIG. 11 is a waveform diagram illustrating the principle of index signal generation by the index signal generating circuit shown in FIG. 10. Referring to FIG. 11, solid-line waveforms represent the ones obtained under a normal ambient temperature (i.e., about a room temperature of 20° C.), and broken-line waveforms represent the ones obtained under a low ambient temperature.

As shown in FIG. 10, the index generating circuit comprises a single-pole magnet 102 (of a north pole or south pole) attached on the circumference of the rotor 101 of a spindle motor, a Hall effect device 103 arranged in the vicinity of the rotor 101, for detecting a change in magnetic flux from the single-pole magnet 102 when the rotor 101 rotates and a comparator 105, the first and second inputs of which are respectively connected to the Hall effect device 103 and a reference voltage power supply 104 to compare the detected output by the Hall effect device 103 with the reference voltage from the reference voltage power supply 104.

Referring to FIG. 11, the operation of the index signal generating circuit thus constructed is now discussed.

When the rotor 101 of the spindle motor is rotating, the single-pole magnet 102 also rotates integrally therewith. In the course of rotation, the single-pole magnet 102 approaches and then goes farther away from the Hall effect device 103, repeatedly. In its position apart from the single-pole magnet 102, the Hall effect device 103 is virtually free from the effect of magnetic flux of the single-pole magnet 102, and its detected output of is nearly zero. In its position near the single-pole magnet 102, the Hall effect device 103 is under the effect of magnetic flux of the single-pole magnet 102. In this way, the detected output of the Hall effect device varies depending on its distance to the single-pole magnet 102. The detected output $V_F$ from the Hall effect device 103 is obtained as shown by a curve $a(V_F)$ in FIG. 11, and fed to a first input of the comparator 105. Meanwhile, the comparator 105 receives, at its second input, a reference voltage Vref from the reference voltage power supply 104 to compare it with the detected output $V_F$. FIG. 11 shows a comparison result $V_C$ as denoted by a curve $b(V_C)$. One edge, for example, the rising edge, of the comparison result $V_C$ is used to form an index signal.

In the conventional index signal generating circuit discussed above, the rotational condition of the spindle motor is detected by the Hall effect device 103, and the comparator 105 compares the detected output $V_F$ of the Hall effect device 103 with the reference voltage Vref of the reference voltage power supply 104, and the comparison output $V_C$ is used to form the index signal. Thus, the index signal generating circuit is of a relatively simple construction.

During the detection of magnetic flux, the sensitivity of the Hall effect device 103 used in the above index signal generating circuit varies with an ambient temperature change. When the ambient temperature drops below the normal room temperature, the magnetic flux detection sensitivity of the device 103 increases depending on the degree of temperature drop, and the detected output $V_{FH}$ output by the Hall effect device 103, represented by a curve $c(V_{FH})$ in FIG. 11, becomes larger in magnitude than the detected output $V_F$ obtained under the normal room temperature. Front and back crossing points where the detected output meets the reference voltage are spaced more apart when the large detected output $V_{FH}$ is compared with the reference voltage Vref than when the normal magnitude detected output $V_F$ is compared with the reference voltage Vref. As a result, the comparison output $V_{CH}$ obtained under the low temperature as shown by a waveform $d(V_{CH})$ in FIG. 11 has one edge (rising edge) shifted more frontward and the other edge (falling edge) shifted more backward.

Because of temperature characteristics unique to each Hall effect device 103, the above index signal generating circuit suffers shifting of the index signal timing with temperature rise and fall, and is unable to generate a precise index signal.

SUMMARY OF THE INVENTION

Accordingly, it is an object of the present invention to provide an index signal generating circuit that generates a precise index signal free from time shifting even under a varying ambient temperature.

To achieve the above object, first means of the index signal generating circuit of the present invention makes use of a magnetic flux detecting device for detecting magnetic flux of a magnet attached onto the rotor of a spindle motor, and a Hall effect device attached onto the spindle motor, for switching a current in the driving coil of the spindle motor, and generates an index signal at the timing the detected output from the magnetic flux detecting device and the output of the Hall effect device coincide with each other in their polarity transition points (zero crossing points).

In the first means, the timing of the transition point (zero crossing point) of the output of the Hall effect device remains unchanged regardless of varying ambient temperatures even when the amplitude of the output of the Hall effect device varies due to its temperature characteristics. If the zero crossing point is used to generate the index signal, the timing of the index signal is constant regardless of ambient temperature changes.

In the same manner as in the first means, second means of the index signal generating circuit of the present invention makes use of a magnetic flux detecting device for detecting magnetic flux of a magnet attached onto the rotor of a spindle motor, and a Hall effect device attached onto the spindle motor, for switching a current in the driving coil of the spindle motor, and generates an index signal at the timing the detected output from the magnetic flux detecting device and the output of the Hall effect device coincide with each other in their polarity transition points (zero crossing points).

In the second means, in the same way as in the first means, the timing of the transition point (zero crossing point) of the output of the Hall effect device remains unchanged regardless of varying ambient temperatures even when the amplitude of the output of the Hall effect device varies due to its temperature characteristics. If the zero crossing point is used to generate the index signal, the timing of the index signal is constant regardless of ambient temperature changes.

Third means of the index signal generating circuit of the present invention makes use of a magnetic flux detecting coil for detecting magnetic flux of a double-pole magnet attached onto the rotor of a spindle motor, a mask voltage generating circuit for masking one of the two peaks of the same polarity of the detected output from the magnetic flux detecting coil, and a feedback type comparator circuit for comparing the detected output with a mask voltage, in order to generate an index signal at the timing the generations of the detected output and the mask voltage coincide with each other.

Since in the third means, the magnetic flux detecting coil is used to detect magnetic flux of the double-pole magnet, the detected output of the magnetic flux detection coil suffers no variations even under ambient temperature changes and the generation timing of the index signal is maintained constant. Furthermore, since one of the two peaks of the same polarity of the detected output is masked by the mask voltage, the generating timing of the index signal is free from an erratic shifting even when the two peaks of the same polarity are at nearly the same level.

Fourth means of the index signal generating circuit of the present invention makes use of a magnetic flux detecting device for detecting magnetic flux of a double-pole magnet attached on-to the rotor of a spindle motor, a Hall effect device attached onto the spindle motor, for switching a current in the driving coil of the spindle motor, and a feedback type comparator circuit for comparing the detected output of the magnetic flux detecting device with tlne output of the Hall effect device. One of the two peaks of the same polarity of the detected output is masked by the sum of the output of the Hall effect device and the output of the feedback type comparator circuit, and an index signal is generated at the timing the feedback type comparator circuit performs the mask operation.

In the fourth means, even if the amplitude of the detected output of the magnetic flux detecting device for detecting magnetic flux of the double-pole magnet varies under ambient temperature changes, the crossing point of the detected output with the sum of the output of the Hall effect device and the output of the feedback type comparator circuit is free from variations. The generation timing of an index signal is maintained constant. Furthermore, since one of the two peaks of the same polarity of the detected output is masked, the generating timing of the index signal is free from an erratic shifting even when the two peaks of the same polarity are at nearly the same level.

The index signal generating circuit of the present invention in its first embodiment comprises a magnet attached onto the circumference of the rotor of a spindle motor, a magnetic flux detecting device for detecting magnetic flux of the magnet when the magnet moves past the magnetic flux detecting device, a Hall effect device for switching a current in the driving coil of the spindle motor, a first waveform shaping circuit for shaping the detected output of the magnetic flux detecting device into a rectangular-wave signal, a second waveform shaping circuit for shaping the output of the Hall effect device into a rectangular-wave signal, and a logic circuit for determining the AND output of the rectangular-wave signals from the first and second waveform shaping circuits, wherein an index signal is generated at the timing of a transition of the AND output of the logic circuit.

According to the first embodiment of the present invention, the first rectangular-wave signal into which the detected output of the magnetic flux detecting device is shaped and the second rectangular-wave signal into which the output of the Hall effect device is shaped are ANDed, and the index signal is generated based on the AND output. Even if the Hall effect device varies its output in amplitude due to its temperature characteristics, the timing of the polarity transition point (zero crossing point) of the output of the Hall effect device remains unchanged under ambient temperature changes. By generating the index signal based on the timing of the zero crossing point, the generation timing of the index signal is maintained constant even under ambient temperature changes.

The index signal generating circuit of the present invention in its second embodiment comprises a magnet attached onto the circumference of the rotor of a spindle motor, a magnetic flux detecting device for detecting magnetic flux of the magnet when the magnet moves past the magnetic flux detecting device, a Hall effect device for switching a current in the driving coil of the spindle motor, a waveform shaping circuit for shaping the output of the Hall effect device into a rectangular-wave signal, and a feedback type comparator circuit for comparing the rectangular-wave signal fed from the waveform shaping circuit to a first input of the comparator circuit with the detected output of the magnetic flux detecting device fed to a second input of the comparator circuit to produce a comparison output, wherein the level of the detected output of the magnetic flux detecting device fed to the second input with no magnetic flux being detected is set to be lower than the negative polarity level of the rectangular-wave signal; the level of the detected output of the magnetic flux detecting device obtained during the negative polarity duration of the rectangular-wave signal is set to be higher than the negative polarity level of the rectangular-wave signal; and an index signal is generated based on the timing of a transition of the comparison output of the comparator.

According to the second embodiment of the present invention, the comparison output is obtained by comparing the detected output of the magnetic flux detecting device with the rectangular-wave signal into which the output of the Hall effect device is shaped, and the index signal is generated based on the comparison output. Even if the Hall effect device varies its output in amplitude due to its temperature characteristics, the timing of the polarity transition point (zero crossing point) of the output of the Hall effect device remains unchanged under ambient temperature changes. By generating the index signal based on the timing of the zero crossing point, the generation timing of the index signal is maintained constant even under ambient temperature changes.

The index signal generating circuit of the present invention in its third embodiment comprises a double-pole magnet attached onto the circumference of the rotor of a spindle motor, a magnetic flux detecting coil for detecting magnetic flux of the double-pole magnet when the double-pole magnet moves past the magnetic flux detecting coil and for generating a detected output having two peaks of the same polarity, a feedback comparator circuit by comparing a direct current voltage fed to a first input of the comparator circuit with the detected output of the magnetic flux detecting coil fed to a second input of the comparator circuit to product a comparison output, and a mask voltage generating circuit for generating a detected signal that lasts during a fixed duration of time from the moment of a transition of the comparison output, and for supplying the detected signal as a mask voltage to the first input of the comparator circuit, wherein the direct current voltage fed to the first input is set to be higher than the level of the detected output of the magnetic flux detecting coil with no magnetic flux being detected but lower than the two peaks of the same polarity of the output magnetic flux detecting coil with magnetic flux being detected; the signal level at the first input as the mask voltage is set to be higher than the two peaks of the same polarity of the detected output; the timing of the supplying of the mask voltage is set such that the mask voltage masks one of the two peaks of the same polarity; and an index signal is generated based on the timing of a transition of the comparison output.

According to the third embodiment of the present invention, the detected output of the magnetic flux detecting coil having the two peaks of the same polarity is compared with the sum that is obtained by superimposing the mask voltage from the mask voltage generating circuit on the comparison output. from the feedback type comparator circuit, and based on the resulting comparison output, the index signal is generated. To detect magnetic flux from the double-pole magnet, the magnetic flux detecting coil that produces the detected output insensitive to temperature variations is used, and thus, the generation timing of the index signal is maintained constant even under ambient temperature changes.

According to the third embodiment of the present invention, one of the two peaks of the same polarity of the detected output is masked by the masking voltage; thus, the generating timing of the index signal is free from an erratic shifting even when two peaks of the same polarity are at nearly the same level.

The index signal generating circuit of the present invention in its fourth embodiment comprises a double-pole magnet attached onto the circumference of the rotor of a spindle motor, a magnetic flux detecting device for detecting magnetic flux of the double-pole magnet when the double-pole magnet moves past the magnetic flux detecting device and for generating a detected output having two peaks of the same polarity, a Hall effect device for switching a current in the driving coil of the spindle motor, a waveform shaping circuit for shaping the output of the Hall effect device into a rectangular-wave signal, and a feedback type comparator circuit for comparing the rectangular-wave signal fed from the waveform shaping circuit to a first input of the comparator circuit with the detected output of the magnetic flux detecting device fed to a second input of the comparator circuit to produce a comparison output, wherein the negative polarity level of the rectangular-wave signal fed to the first input is set to be higher than the detected output of the magnetic flux detecting device with no magnetic flux from the double-pole magnet being detected, but lower than the two peaks of the same polarity of the detected output of the magnetic flux detecting device with magnetic flux from the double-pole magnet being detected; the timing the rectangular-wave signal fed to the first input is transitioned to a positive polarity level is set such that one of the two peaks of the same polarity is masked; and thus an index signal is generated based on the timing of the transition of the comparison output.

According to the fourth embodiment of the present invention, the detected output of the magnetic flux detecting device containing the two peaks of the same polarity is compared with the sum output that is obtained by summing the comparison output of the feedback type comparator circuit and the rectangular-wave signal into which the output of the Hall effect device is shaped, and based on the resulting comparison, the index signal is generated. Even if the amplitude of the detected output of the magnetic flux detecting device for detecting magnetic flux from the double-pole magnet varies with ambient temperature, the amplitude of the detected output in the vicinity of its zero crossing point coincides with the sum output at level, and the coincidence points are free from shifting even under ambient temperature changes. The generation timing of the index signal remains unaffected by ambient temperature changes.

According to the fourth embodiment of the present invention, one of the two peaks of the same polarity of the detected output is masked by the masking voltage; thus, the generating timing of the index signal is free from an erratic shifting even when two peaks of the same polarity are at nearly the same level.

BRIEF DESCRIPTION OF THE DRAWINGS

FIGS. 7(a) through 7(c) are voltage waveform diagrams illustrating the operation of the third embodiment of FIG. 6;

FIGS. 9(a) through 9(d) are voltage waveform diagrams illustrating the operation of the fourth embodiment of FIG. 8;

DESCRIPTION OF THE PREFERRED EMBODIMENTS

Figure 1:
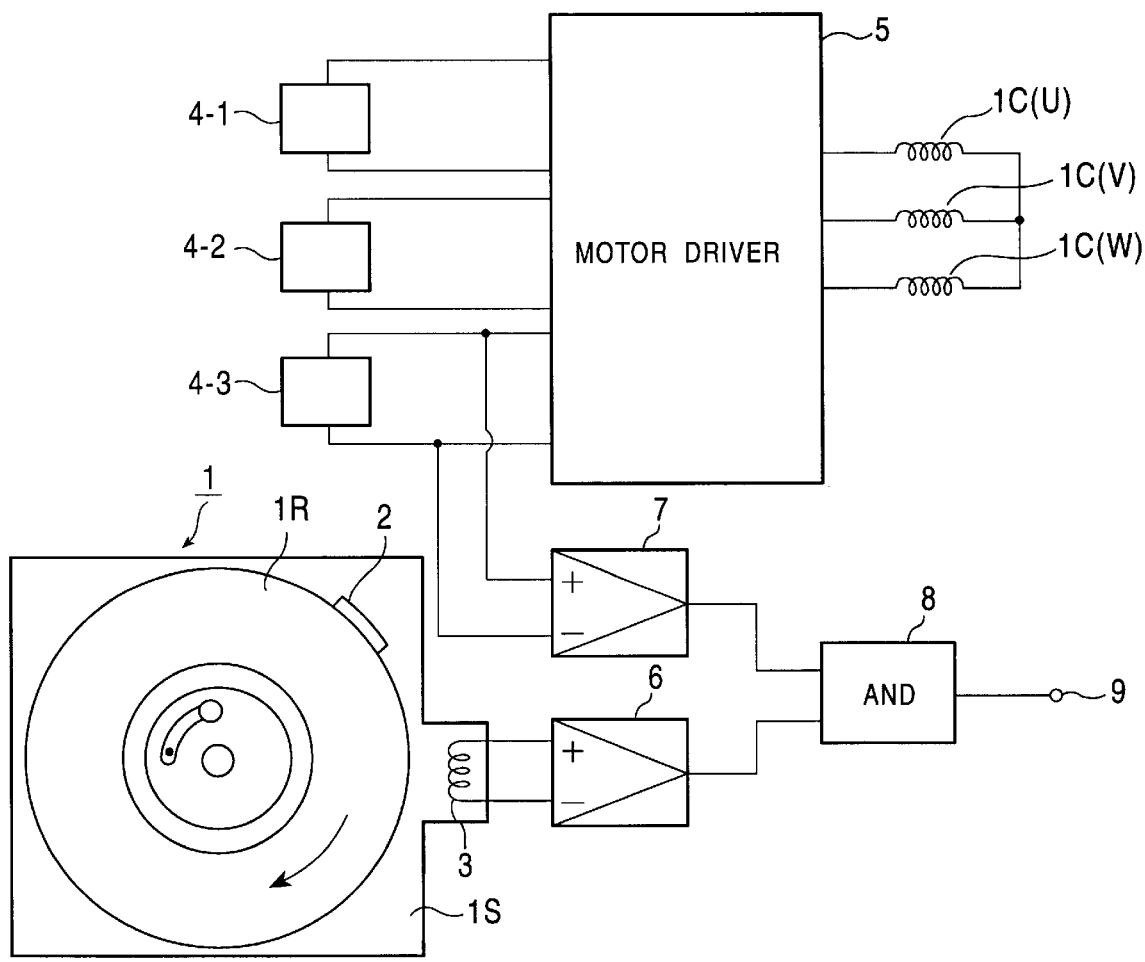
FIG. 1 is a block diagram showing a first embodiment of the index signal generating circuit of the present invention.

Referring now to the drawings, the embodiments of the present invention are now discussed.

Figure 2:
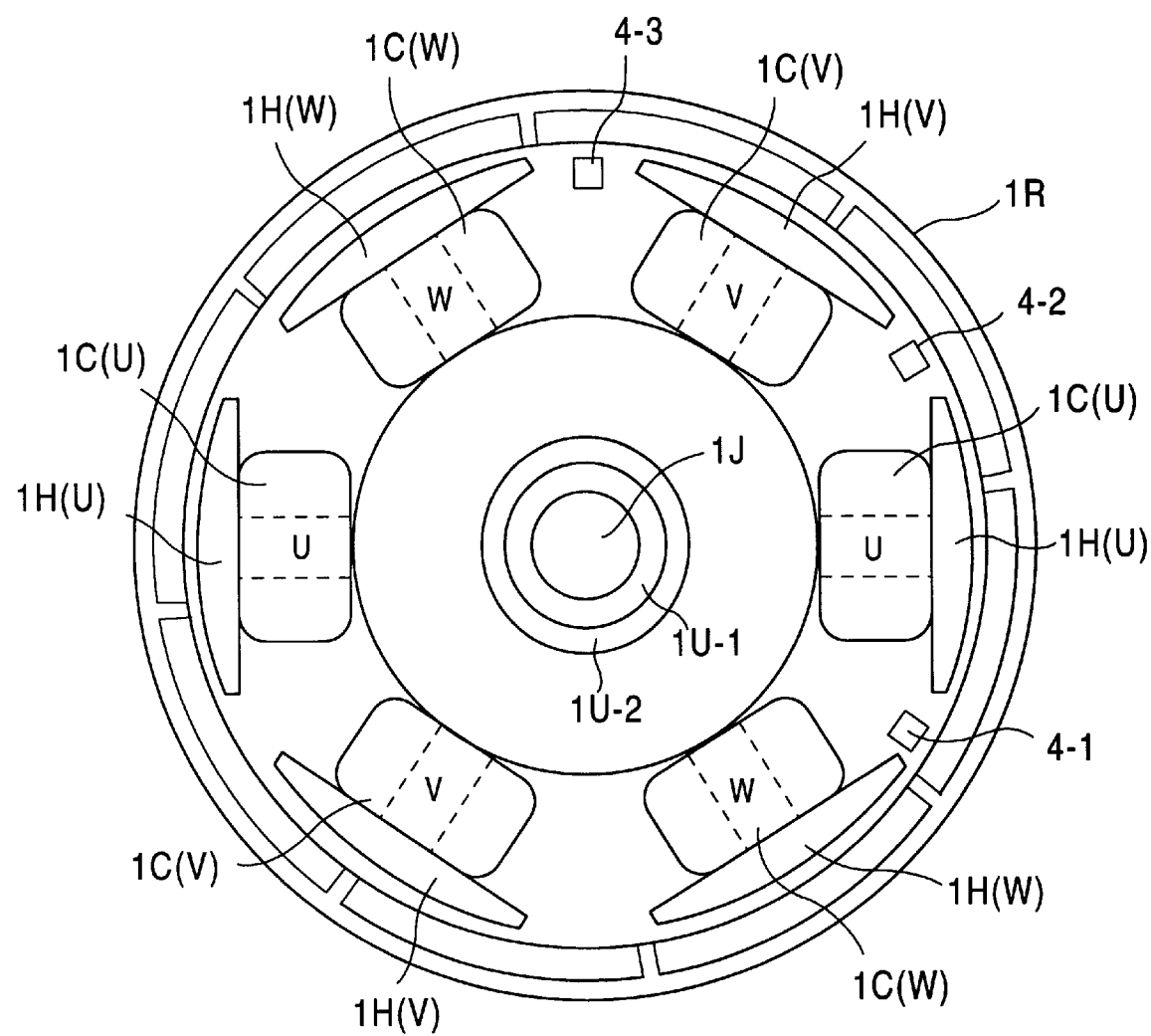
FIG. 2 is a cross-sectional view showing a spindle motor with Hall effect devices for switching currents in driving coils of the spindle motor.

FIG. 1 is a block diagram showing a first embodiment of the index signal generating circuit of the present invention, FIG. 2 is a cross-sectional view showing a spindle motor with Hall effect devices for switching currents in driving coils of the spindle motor, and FIGS. 3(a)–3(e), and 3(c') and 3(d') show voltage waveform diagrams illustrating the operation of the first embodiment shown in FIG. 1.

Referring to FIG. 1, the first embodiment of the present invention comprises a single-pole magnet 2 attached onto the circumference of the rotor 1R of a spindle motor 1, a magnetic flux detecting coil 3 arranged in the vicinity of the circumference of the rotor 1R, for detecting magnetic flux of the single-pole magnet 2, three Hall effect devices 4(1), 4(2), and 4(3) mounted on the stator 1S of the spindle motor 1, for switching currents in driving coils 1C(U), 1C(V), and 1C(W), respectively, a motor driver 5 for driving the spindle motor 1, a first waveform shaping circuit 6 for shaping the magnetic flux detected output from the magnetic flux detecting coil 3 into a first rectangular-wave signal, a second waveform shaping circuit 7 for shaping, into a second rectangular-wave signal, the output of one of the three Hall effect devices 4(1) through 4(3), for example, the output of Hall effect device 4(3), an AND gate 8 for ANDing the first and second rectangular-wave signals, and a signal output terminal 9 for outputting an index signal.

The motor driver 5 is connected to the three Hall effect devices 4(1), 4(2) and 4(3), and three-phase driving coils 1C(U), 1C(V) and 1C(W) in the spindle motor 1. The magnetic flux detecting coil 3 is connected to the first waveform shaping circuit 6, and one of the Hall effect devices 4(3) is connected to the second waveform shaping circuit 7. The outputs of the first and second waveform shaping circuits 6 and 7 are connected to the AND gate 8, and the output of the AND gate 8 is connected to the signal output terminal 9.

Referring to FIG. 2, the spindle motor 1 comprises the rotor 1R and the stator 1S. The rotor 1R is constructed of regularly arranged eight magnetic poles (labeled with no reference numerals) with miniature demagnetized areas (with no reference numerals) therebetween. The stator 1S is constructed of, on its board, a center shaft 1J, a bearing 1U(1) and a bearing case 1U(2) arranged around the center shaft 1J, six umbrella-shaped supports 1H(U), 1H(V), and 1H(W) that are equally circularly spaced around the center shaft 1J, and three-phase driving coils 1C(U), 1C(V), and 1C(W) wound around the respective feet of the umbrella-shaped supports 1H(U), 1H(V), and 1H(W). The stator 1S is also provided with Hall effect devices 4(1), 4(2), and 4(3) between umbrella-shaped supports 1H(W) and 1H(U), between 1H(U) and 1H(V), and between 1H(V) and 1H(W), respectively.

In the spindle motor thus constructed, three-phase alternating currents are supplied by a three-phase alternating current source (not shown). A phase-U current flows through the driving coil 1C(U), a phase-V current flows through the driving coil 1C(V), and a phase-W current flows through the driving coil 1C(W), thus rotating the rotor 1R around the stator 1S. Meanwhile, the Hall effect device 4(1) determines the positions of the eight magnetic poles by detecting a magnetic flux change that is created as each of the demagnetized areas of the rotor 1R approaches and then parts, and generates a switch control signal for the phase-U current flowing through the phase-U driving coil 1C(U). In a similar fashion, the Hall effect device 4(2) generates a switch control signal for the phase-V current flowing through the phase-V driving coil 1C(V), and the Hall effect device 4(3) generates a switch control signal for the phase-W current flowing through the phase-W driving coil 1C(W).

Referring to the voltage waveform diagrams shown in FIGS. 3(a)–3(e), and 3(c') and 3(d'), the operation of the first embodiment is now discussed.

When the spindle motor 1 is being rotating, the Hall effect device 4(3) on the stator 1S detects the positions of the eight magnetic poles with the rotor 1R rotating, and generates an alternating current output voltage with positive and negative polarity levels as shown in FIG. 3(a). With the rotor 1Et rotating, the single-pole magnet 2 attached on the circumference of the rotor 1R rotates integrally, the magnetic flux detecting coil 3 senses a periodic proximity to the single-pole magnet 2 by detecting a change in magnetic flux, and outputs a magnetic flux detected output as shown in FIG. 3(c). The output voltage provided by the Hall effect device 4(3) is shaped through the second waveform shaping circuit 7 into the second rectangular-wave signal that periodically changes in polarity as shown in FIG. 3(b). The magnetic flux detected output from the magnetic flux detecting coil 3 is shaped through the first waveform shaping circuit 6 into the first rectangular-wave signal in a single-shot pulse waveform as shown in FIG. 3(d). The AND gate 8 ANDs the first rectangular-weave signal and the second rectangular-wave signal, and outputs a single-shot pulse (the AND output) having a pulse length shorter than that of the second rectangular-wave signal, as shown in FIG. 3(e).

The AND output has its rising edge coinciding with the rising edge of the second rectangular-wave signal, namely the timing of the zero crossing of the voltage output of the Hall effect device 4(3), and its falling edge coinciding with the falling edge of the first rectangular-wave signal. The rising edge of the AND output is used to generate an index signal.

Figure 3:
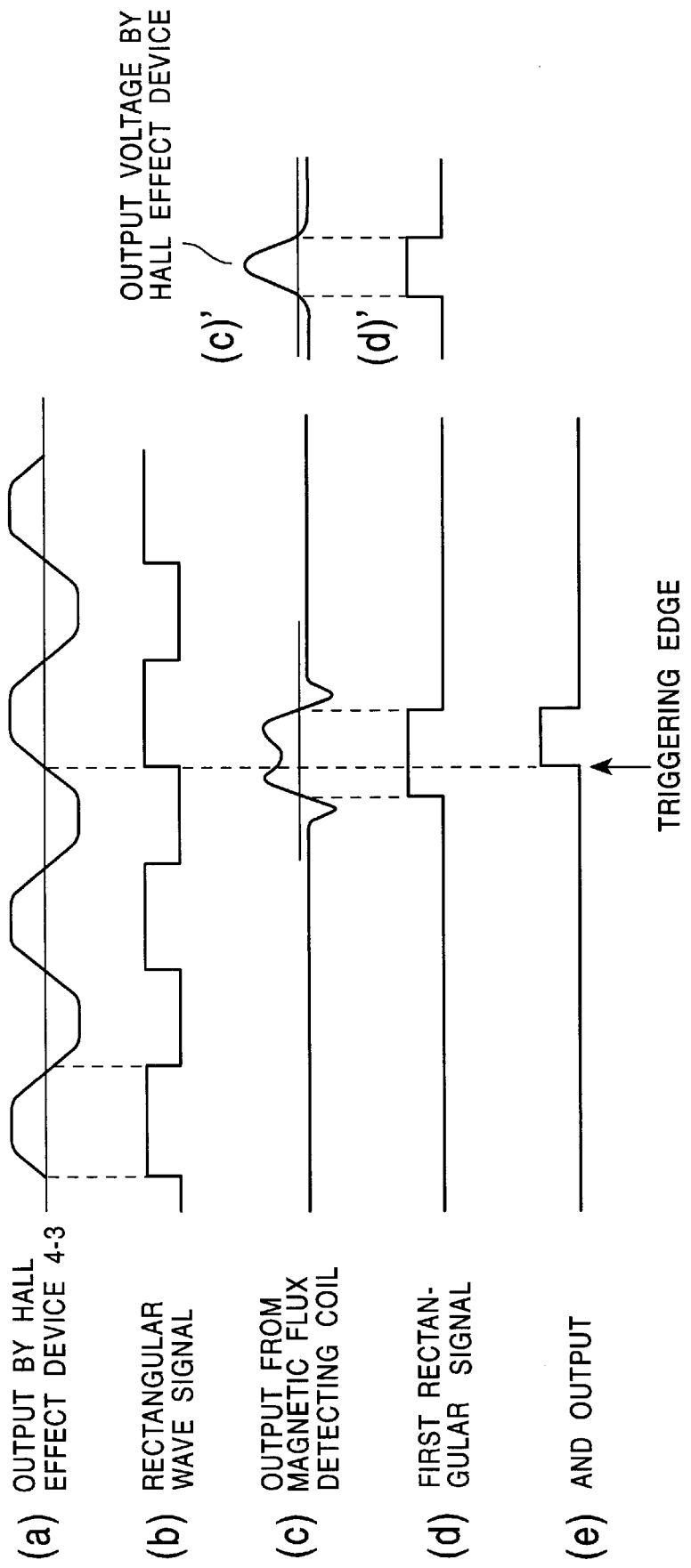
FIGS. 3(a) through 3(e) are voltage waveform diagrams illustrating the operation of the first embodiment of FIG. 1.

The first embodiment employs the magnetic flux detecting coil 3 to pick up magnetic flux of the single-pole magnet 2. Alternatively, the magnetic flux detecting coil 3 may be replaced with a magnetic flux detecting Hall effect device (not shown). In such a case, the voltage output of the magnetic flux detecting Hall effect device is obtained as shown in FIG. 3(c'), and the first rectangular-wave signal from the first waveform shaping circuit 6 is obtained as shown in FIG. 3(d'). The rest of the operation remains unchanged from the operation of the first embodiment.

The first embodiment employs the single-pole magnet 2. Alternatively, it may be replaced with a double-pole magnet (not shown). In such a case, the output voltage of the magnetic flux detecting Hall effect device is of a dual polarity waveform with negative and positive levels, and the first rectangular-wave signal from the first waveform shaping circuit 6 includes two pulses. If the timing of one of the pulses of the first rectangular-wave signal is set to coincide with the rising edge of the second rectangular-wave signal, this modification works in much the same way the first embodiment works.

According to the first embodiment, the timing of the rising edge of the AND output, namely the timing of the zero crossing of the voltage output of the Hall effect device 4(3), is used to generate the index signal. The zero crossing points of the voltage output of the Hall effect device 4(3) is insensitive to temperature even though the amplitude of the voltage output of the Hall effect device 4(3) is dependent on temperature. The generation timing of the index signal is free from variations even under ambient temperature changes.

Figure 4:
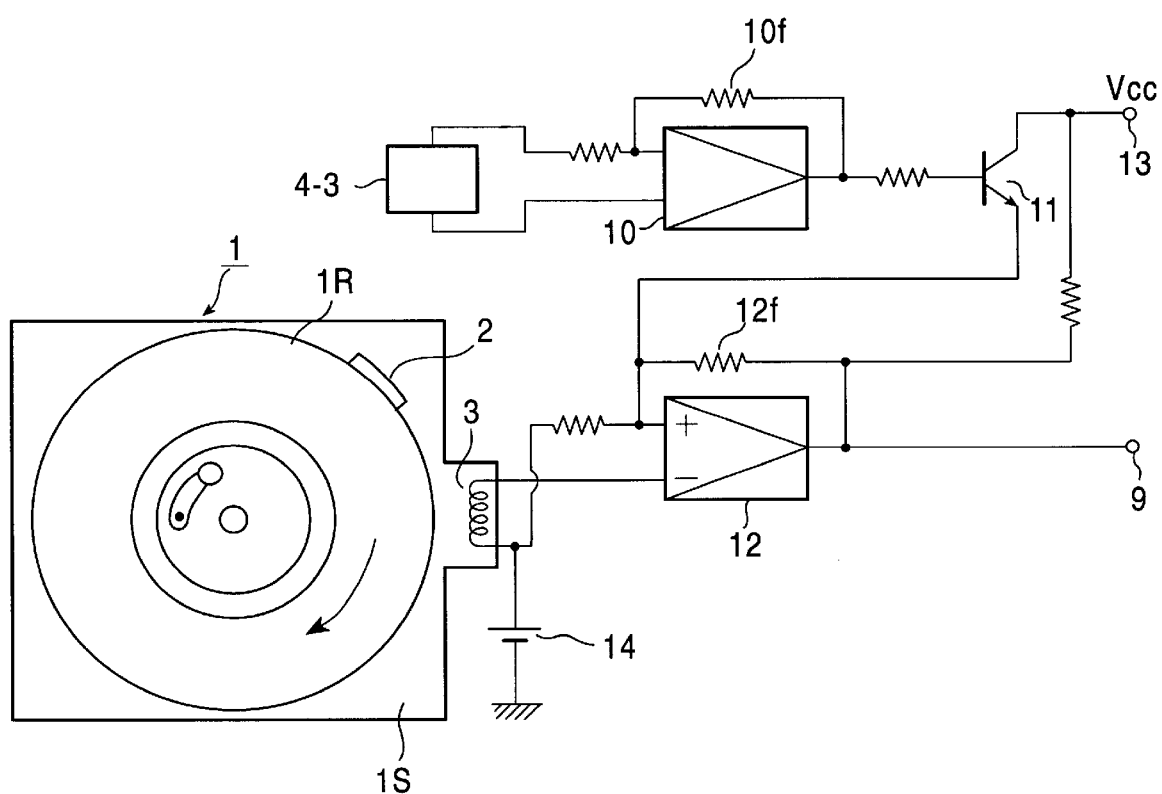
FIG. 4 is a block diagram showing a second embodiment of the index signal generating circuit of the present invention.
Figure 5:
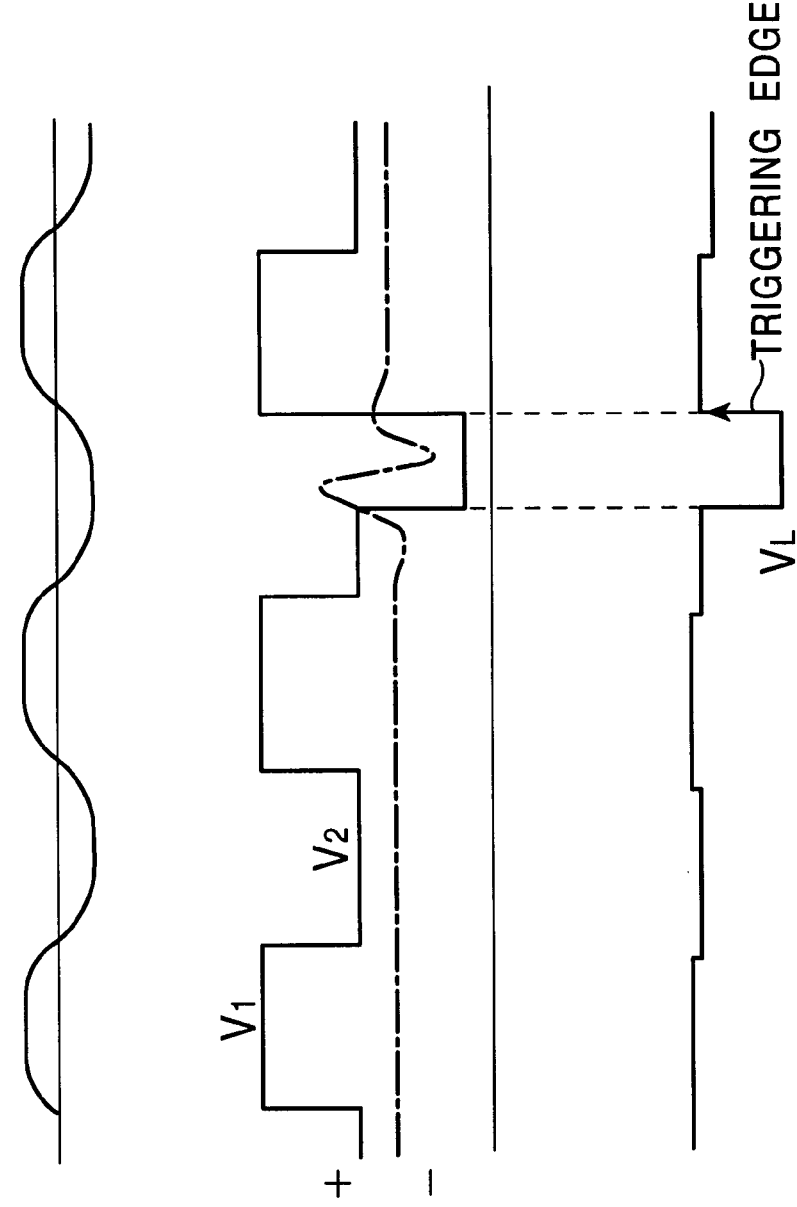
FIGS. 5(a) through 5(c) are voltage waveform diagrams illustrating the operation of the second embodiment of FIG. 4.

FIG. 4 is a block diagram showing a second embodiment of the index signal generating circuit of the present invention. FIGS. 5(a) through 5(c) are waveform diagrams of voltage waveforms illustrating the operation of the second embodiment of FIG. 4. As shown in FIG. 4, components equivalent to those described with reference to FIG. 1 are designated with the same reference numerals.

Referring to FIG. 4, the second embodiment of the present invention comprises a single-pole magnet 2 attached onto the circumference of the rotor 1R of a spindle motor 1, a magnetic flux detecting coil 3 arranged in the vicinity of the circumference of the rotor 1R, for detecting magnetic flux of the single-pole magnet 2, a Hall effect device 4(3) mounted on the stator 1S of the spindle motor 1, for switching a current in a driving coil 1C(W), a waveform shaping circuit 10 for shaping the output from the Hall effect device 4(3) into a rectangular-wave signal, a transistor 11 for switching the output rectangular-wave signal from the waveform shaping circuit 10, a comparator circuit 12 for comparing the magnetic flux detected output from the magnetic flux detecting coil 3 with the output from the transistor 11, a power supply terminal 13 and a bias voltage power supply 14.

The waveform shaping circuit 10 has a feedback resistor 10f connected between its non-inverting input and its output. The non-inverting input of the waveform shaping circuit 10 is connected to one terminal of the Hall effect device 4(3) via a resistor (with no reference numeral), while the inverting input of the waveform shaping circuit 10 is directly connected to the other terminal of the Hall effect device 4(3). The transistor 11 is arranged with its base connected to the output of the waveform shaping circuit 10 via a resistor (with no reference numeral), its emitter connected to the power supply terminal 13, and its collector connected to the non-inverting input of the comparator circuit 12. The comparator circuit 12 has a feedback resistor 12f connected between its non-inverting input and its output. The inverting input of the comparator circuit 12 is directly connected to one terminal of the magnetic flux detecting coil 3, the non-inverting input of the comparator circuit 12 is connected to the other terminal of the magnetic flux detecting coil 3 via a resistor (with no reference numeral), and the output of the comparator circuit 12 is connected to a signal output terminal 9 and via a resistor (with no reference numeral) to the power supply terminal 13. The bias voltage power supply 14 is connected between the other terminal of the magnetic flux detecting coil 3 and ground.

Referring to the waveform diagrams FIGS. 5(a) through 5(c), the operation of the second embodiment is now discussed.

When the spindle motor 1 is being rotating, the Hall effect device 4(3) on the stator 1S detects the positions of the eight magnetic poles with the rotor 1R rotating, and generates an alternating current output voltage with positive and negative polarity levels as shown in FIG. 5(a). With the rotor 1R rotating, the single-pole magnet 2 attached on the circumference of the rotor 1R rotates integrally, the magnetic flux detecting coil 3 senses a periodic proximity to the single-pole magnet 2 by detecting a change in magnetic flux, and outputs a magnetic flux detected output. The voltage output provided by the Hall effect device 4(3) is shaped through the waveform shaping circuit 10 into the rectangular-wave signal that is switched by the transistor 11 as shown by a solid line in FIG. 5(b). The rectangular-wave signal is thus periodically transitioned between voltage levels $V_1$ and $V_2$. The bias voltage power supply 14 superimpose a direct current voltage to the magnetic flux detected output from the magnetic flux detecting coil 3 to produce a voltage signal shown by a chain line with one dot in FIG. 5(b). The voltage value of the bias voltage power supply 14 and resistance values of associated resistors are determined such that the voltage level of the voltage signal is lower than both voltage levels $V_1$ and $V_2$ of the rectangular-wave signal when the magnetic flux detecting coil 3 detects no magnetic flux, and such that the voltage level of a positive polarity peak is between both voltage levels $V_1$ and $V_2$ when the magnetic flux detecting coil 3 detects magnetic flux. The comparator circuit 12 compares the rectangular-wave signal (a first input) that is periodically transitioned between both voltage levels $V_1$ and $V_2$, with the direct current voltage superimposed voltage signal (a second input), thereby generating a short-length, one-shot, negative polarity, rectangular-wave signal (a conversion output) as shown in FIG. 5(c). The resulting conversion output is provided to the signal output terminal 9.

The comparison output has its falling edge occurring at the timing the voltage level of the second input rises above that of the first input and its rising edge occurring at the timing the voltage level of the first input rises above that of the second input, namely, at a zero crossing point of the output of the Hall effect device 4(3). The rising edge of the comparison output is used to generate the index signal.

The second embodiment employs the magnetic flux detecting coil 3 to detect magnetic flux of the single-pole magnet 2. Alternatively, a magnetic flux detecting Hall effect device (not shown) may be used instead of the magnetic flux detecting coil 3. Furthermore, the single-pole magnet 2 may be replaced with a double-pole magnet (not shown). The operation of these modifications is substantially identical to that of the second embodiment.

According to the second embodiment of the present invention, the rising edge of the comparison output, namely the zero crossing point of the voltage output of the Hall effect device 4(3) is used. The zero crossing point of the voltage output of the Hall effect device 4(3) is insensitive to temperature even though the amplitude of the voltage output of the Hall effect device 4(3) is dependent on temperature. Thus, the generation timing of the index signal is free from variations even under ambient temperature changes.

Figure 6:
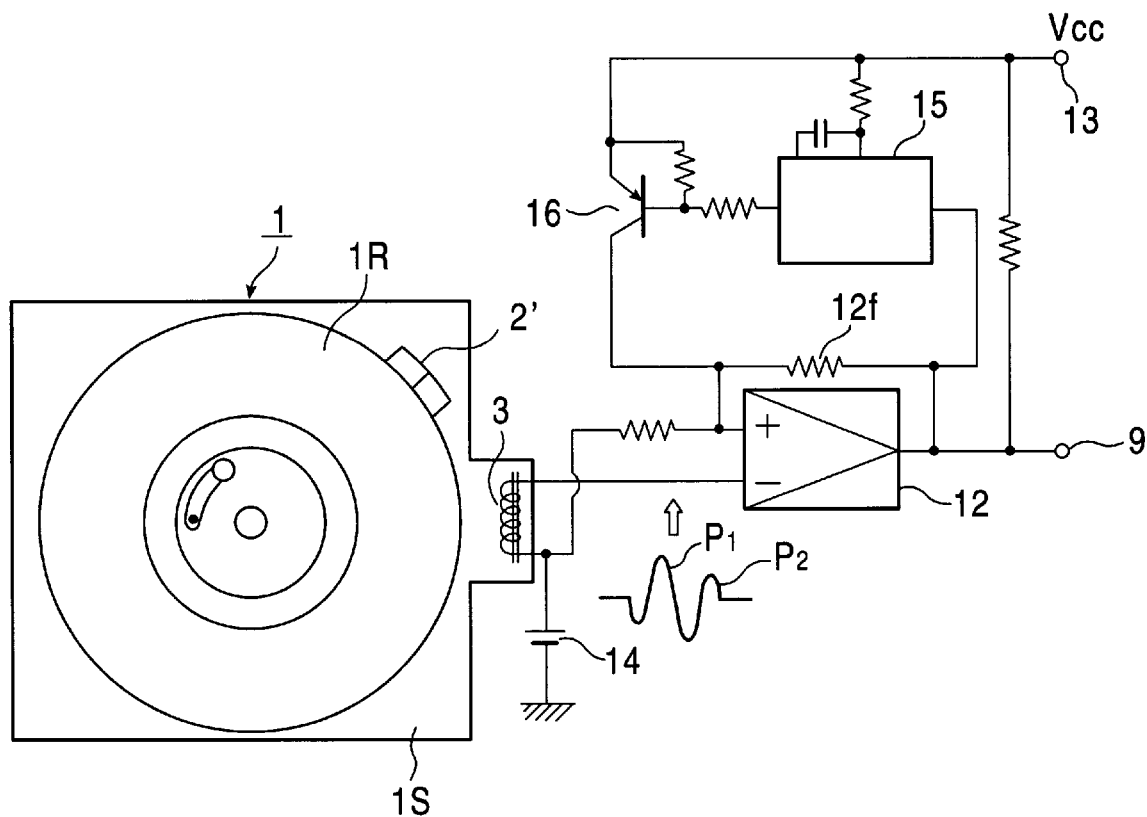
FIG. 6 is a block diagram showing a third embodiment of the index signal generating circuit of the present invention.

FIG. 6 is a block diagram showing a third embodiment of the index signal generating circuit of the present invention, and FIGS. 7(a) through 7(c) are voltage waveform diagrams illustrating the operation of the third embodiment of FIG. 6. The third embodiment employs a double-pole magnet 2' instead of the magnet 2 and means for masking one of two peaks of the same polarity as the detected output. In FIG. 6, components equivalent to those described with reference to FIG. 4 are designated with the same reference numerals.

Referring to FIG. 6, the third embodiment of the present invention comprises a double-pole magnet 2' attached onto the circumference of the rotor 1R of a spindle motor 1, a magnetic flux detecting coil 3 arranged in the vicinity of the circumference of the rotor 1R, for detecting magnetic flux of the double-pole magnet 2', a comparator circuit 12 for comparing the magnetic flux detected output from the magnetic flux detecting coil 3 with an output mask signal from a transistor 16, a power supply terminal 13, a bias voltage power supply 14, a monostable multivibrator (a mask voltage generating circuit) 15 for generating a rectangular-wave signal that lasts for a fixed duration of time from the time of reception of the comparison output from the comparator circuit 12, and a transistor 16 for switching the output rectangular-wave signal from the monostable multivibrator 15 to produce a mask signal.

The comparator circuit 12 has a feedback resistor 12f connected between its non-inverting input and its output. The inverting input of the comparator circuit 12 is connected to one terminal of the magnetic flux detecting coil 3, the non-inverting input of the comparator circuit 12 is connected to the other terminal of the magnetic flux detecting coil 3 via a resistor (with no reference numeral), and the output of the comparator circuit 12 is connected to a signal output terminal 9 and via a resistor (with no reference numeral) to the power supply terminal 13. The bias voltage power supply 14 is connected between the other terminal of the magnetic flux detecting coil 3 and ground. The monosteable multivibrator 15 is arranged with its input connected to the output of the comparator circuit 12 and with its output connected to the base of the transistor 16 via a resistor (with no reference numeral). The transistor 16 has a resistor (with no reference numeral) connected between its base and emitter, with its collector connected to the non-inverting input of the comparator circuit 12 and with its emitter connected to the power supply terminal 13.

Referring to voltage waveform diagrams in FIGS. 7(a) through 7(c), the third embodiment of the present invention is now discussed.

When the spindle motor 1 is being rotating, the double-pole magnet 2' attached on the circumference of the rotor 1R rotates integrally with the rotor 1R. The magnetic flux detecting coil 3 arranged in the vicinity of the circumference of the rotor 1R senses a periodic proximity to the double-pole magnet 2' by detecting a change in magnetic flux, and outputs a magnetic flux detected output. The magnetic flux detected output thus obtained has two positive-going peaks $P_1$, $P_2$ when magnetic flux is detected, as shown by a solid line in FIG. 7(a). The comparator circuit 12 compares the voltage level (a first input) received at its non-inverting input as shown by a chain line with one dot in FIG. 7(a) with the magnetic flux detected output (a second input) received at its inverting input as shown by the solid line in FIG. 7(a). The comparator circuit 12 thus provides a negative going comparison output which falls at the timing the voltage level of the second input rises above that of the first input and which falls at the timing the voltage level of the first input rises above that of the second input, as shown in FIG. 7(b) and then provides the comparison output to the signal output terminal 9. Responding to the rising edge of the comparison output, the monostable multivibrator 15 generates a negative-going rectangular-wave signal that lasts for a fixed duration of time as shown in FIG. 7(c). During the negative-going pulse of the rectangular-wave signal, the transistor 16 becomes conductive, supplying a high-voltage level $V_H$ near power supply voltage Vcc to the non-inverting input of the comparator circuit 12 as shown by the chain line with one dot in FIG. 7(a). While the non-inverting input is supplied with the high-voltage level $V_H$, the voltage level of the first input is substantially greater than the voltage level of the second input in the comparator circuit 12, and the backward peak $P_2$ of the two positive-going peaks $P_1$, $P_2$ is masked. At the timing of the frontward peak $P_1$ of the two positive-going peaks $P_1$, $P_2$, no mask signal is output from the transistor 16, and thus voltage comparison already described is performed to the peak $P_1$. To perform the above operation, the voltage value of the bias voltage power supply 14 and resistance values of associated resistors are determined such that the voltage $V_2$ of the magnetic flux detected output with no magnetic flux detected in the magnetic flux detecting coil 3 is slightly lower than the voltage level $V_1$ fed to the non-inverting input of the comparator circuit 12 and the value $P_1$ of the positive-going peak with magnetic flux detected in the magnetic flux detecting coil 3 is higher than the voltage level $V_2$.

The comparison output has its falling edge at the timing the voltage level of the second input rises above that of the first input and its rising edge at the timing the voltage level of the first input rises above that of the second input, namely at a zero crossing point of the voltage output of the magnetic flux detecting coil 3. The rising edge of the comparison output is used to generate the index signal.

According to the third embodiment of the present invention, the rising edge of the comparison output, namely the timing in the vicinity of the zero crossing point of the magnetic flux detected output of the magnetic flux detecting coil 3 is used. The zero crossing point of the magnetic flux detected output is insensitive to temperature even though the amplitude of the magnetic flux detected output is dependent on temperature. Thus, the generation timing of the index signal is free from variations even under ambient temperature changes.

Furthermore, according to the third embodiment of the present invention, the magnetic flux detected output from the magnetic flux detecting coil 3 contains the two peaks of the same (positive-cgoing) polarity. Even if there is no substantial level difference between both peaks $P_1$, $P_2$, the generating timing of the index signal is free from an erratic shifting, because one peak $P_2$ is masked by the mask signal.

Figure 8:
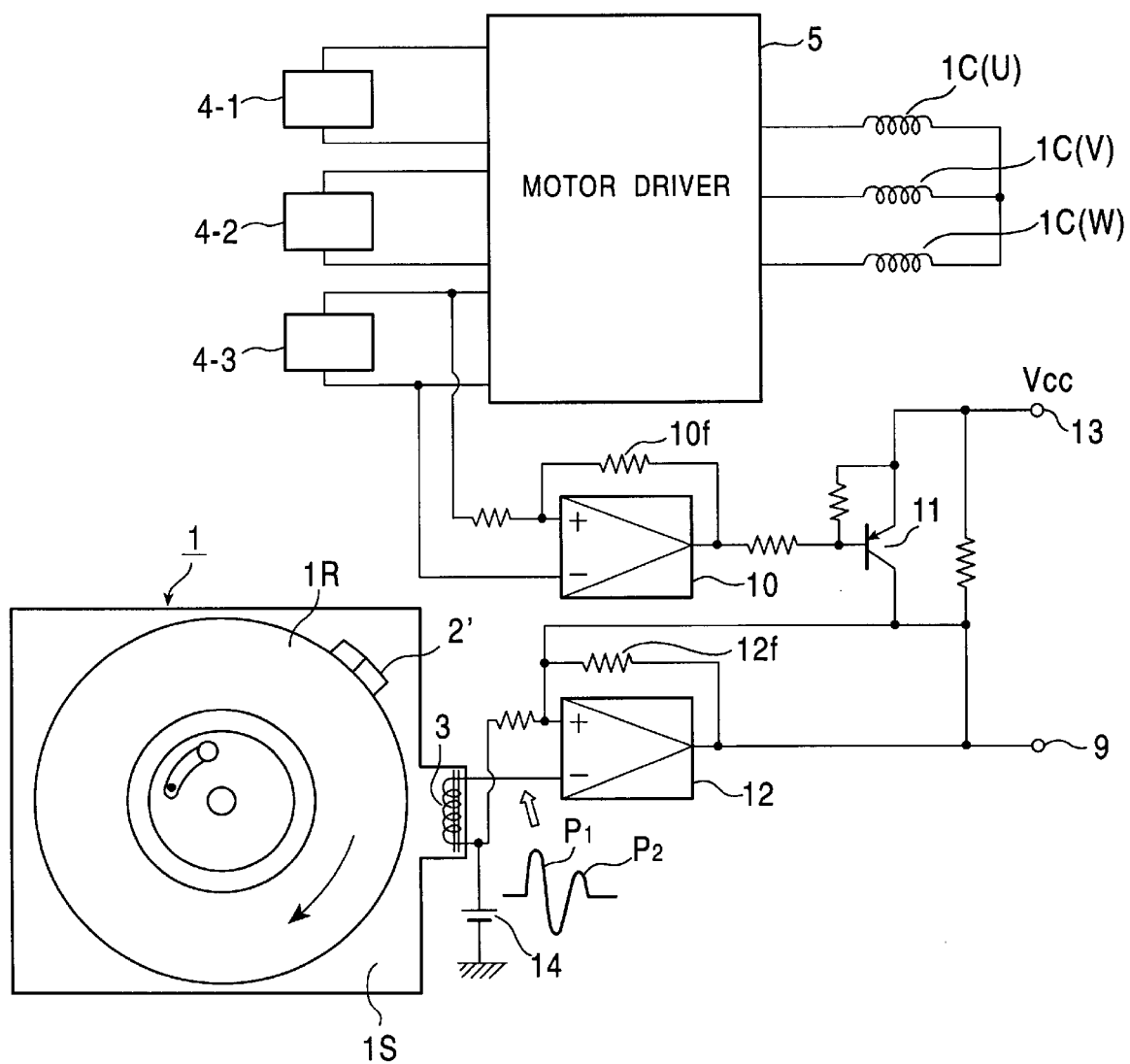
FIG. 8 is a block diagram showing a fourth embodiment of the index signal generating circuit of the present invention.

FIG. 8 is a block diagram showing a fourth embodiment of the index signal generating circuit of the present invention, and FIGS. 9(a) through 9(c) are voltage waveform diagrams illustrating the operation of the fourth embodiment of FIG. 8. In the same way as the third embodiment does, the fourth embodiment employs a double-pole magnet 2' instead of the magnet 2 and means for masking one of two peaks of the same polarity as the detected output. In FIG. 8, components equivalent to those described with reference to FIGS. 1 and 4 are designated with the same reference numerals.

Referring to FIG. 8, the fourth embodiment of the present invention comprises a double-pole magnet 2' attached onto the circumference of the rotor 1R of a spindle motor 1, a magnetic flux detecting coil 3 arranged in the vicinity of the circumference of the rotor 1R, for detecting magnetic flux of the double-pole magnet 2', three Hall effect devices 4(1), 4(2), and 4(3) mounted on a stator 1S of the spindle motor 1, for switching currents in driving coils 1C(U), 1C(V), and 1C(W), respectively, a motor driver 5 for driving the spindle motor 1, a waveform shaping circuit 10 for shaping the output from the Hall effect device 4(3) into a rectangular-wave signal, a transistor 11 for switching the output rectangular-wave signal from the waveform shaping circuit 10, a comparator circuit 12 for comparing the magnetic flux detected output from the magnetic flux detecting coil 3 with the output from the transistor 11, a power supply terminal 13 and a bias voltage power supply 14.

The motor driver 5 is connected to the three Hall effect devices 4(1), 4(2) and 4(3), and three-phase driving coils 1C(U), 1C(V) and 1C(W) in the spindle motor 1. The waveform shaping circuit 10 has a feedback resistor 10f connected between its non-inverting input and its output. The non-inverting input of the waveform shaping circuit 10 is connected to one terminal of the Hall effect device 4(3) via a resistor (with no reference numeral), while the inverting input of the waveform shaping circuit 10 is directly connected to the other terminal of the Hall effect device 4(3). The transistor 11 is arranged with its base connected to the output of the waveform shaping circuit 10 via a resistor (with no reference numeral), its emitter connected to the power supply terminal 13, and its collector connected to the non-inverting input of the comparator circuit 12. The transistor 11 has a resistor (with no reference numeral) connected between its base and emitter. The comparator circuit 12 has a feedback resistor 12f connected between its non-inverting input and its output. The inverting input of the comparator circuit 12 is directly connected to one terminal of the magnetic flux detecting coil 3, the non-inverting input of the comparator circuit 12 is connected to the other terminal of the magnetic flux detecting coil 3 via a resistor (with no reference numeral), and the output of the comparator circuit 12 is connected to a signal output terminal 9 and via a resistor (with no reference numeral) to the power supply terminal 13. The bias voltage power supply 14 is connected between the other terminal of the magnetic flux detecting coil 3 and ground.

Referring to the waveform diagrams FIGS. 9(a) through 9(d), the fourth embodiment of the present invention is now discussed.

Figure 10:
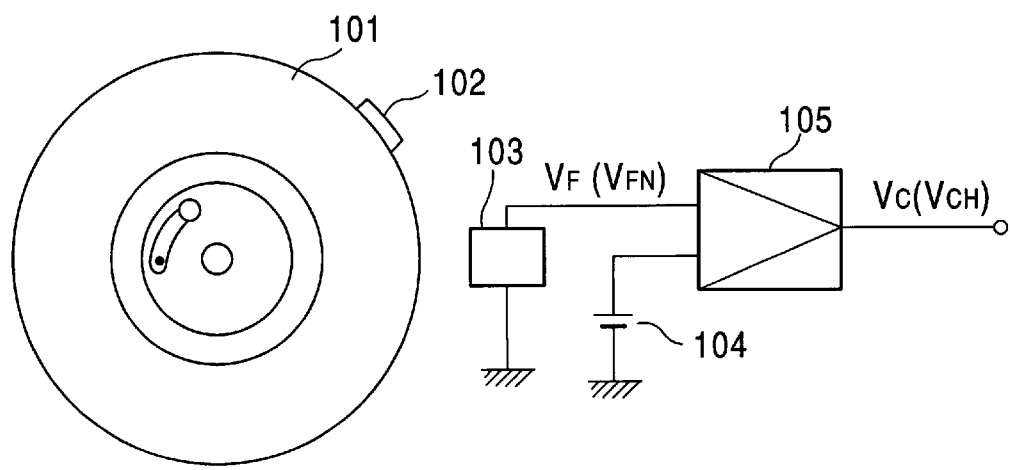
FIG. 10 is a block diagram showing a conventional index signal generating circuit.
Figure 11:
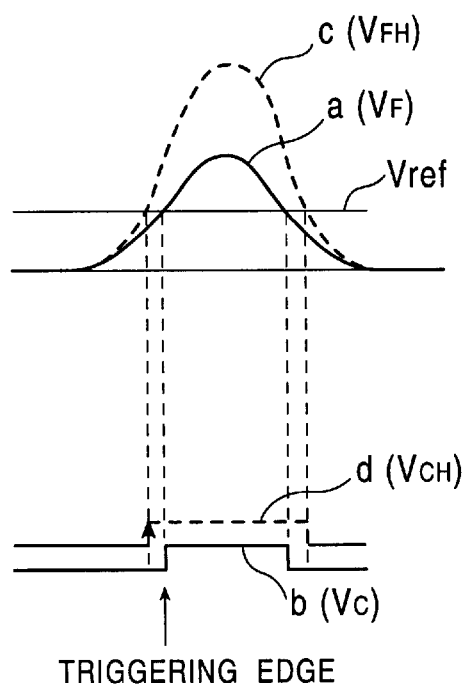
FIG. 11 is a waveform diagram showing the principle of index signal generation in the index signal generating circuit of FIG. 10.

When the spindle motor 1 is being rotating, the Hall effect device 4(3) on the stator 1S detects the positions of the eight magnetic poles with the rotor 1R rotating, and generates an alternating current output voltage with positive and negative polarity levels as shown in FIG. 9(a). With the rotor 1R rotating, the double-pole magnet 2' attached on the circumference of the rotor 1R rotates integrally, and the magnetic flux detecting coil 3 arranged in the vicinity of the circumference of the rotor 1R senses a periodic proximity to the double-pole magnet 2' by detecting a change in magnetic flux, and outputs a magnetic flux detected output. The magnetic flux detected output thus obtained has two positive-going peaks $P_1$, $P_2$ when magnetic flux is detected, as shown in FIG. 8. The waveform shaping circuit 10 shapes the voltage output from the Hall effect device 4(3) into a rectangular-wave signal as shown in FIG. 10(b). The transistor 11 switches the rectangular-wave signal to form a rectangular-wave signal that is periodically transitioned between voltage levels $V_1$ and $V_2$ as shown by a chain line with one dot in FIG. 9(c). The bias voltage power supply 14 superimpose a direct current voltage to the magnetic flux detected output from the magnetic flux detecting coil 3 to produce a voltage signal shown by a solid line in FIG. 9(c). The voltage value of the bias voltage power supply 14 and resistance values of associated resistors are determined such that the voltage level of the voltage signal with no magnetic flux detected in the magnetic flux detecting coil 3 is lower than both voltage levels $V_1$ and $V_2$ of the rectangular-wave signal, and such that the voltage levels of the two positive-going peaks $P_1$ and $P_2$ are between both voltage levels $V_1$ and $V_2$ when the magnetic flux detecting coil 3 detects magnetic flux. The comparator circuit 12 compares the rectangular-wave signal (a first input) that is periodically transitioned between both voltage levels $V_1$ and $V_2$, with the direct current voltage superimposed voltage signal (a second input), thereby generating a short-length, one-shot, negative polarity, rectangular-wave signal (a conversion output) as shown in FIG. 9(d). The resulting conversion output is provided to the signal output terminal 9.

In the fourth embodiment, one peak $P_1$ of the second input is set to come within the low-voltage level $V_2$ duration of the first input and the other peak $P_2$ of the second input is set to come within the high-voltage level $V_1$ duration of the first input. The one peak $P_1$ of the second input is used to detect the timing the voltage level of the second input rises above that of the first input and the timing the voltage level of the first input rises above that of the second input. In contrast, the other peak $P_2$ of the second input is masked by the high-voltage level $V_1$ of the first input, thus causing no voltage level transition between the first input and second input.

The comparison output has its falling edge occurring at the timing the voltage level of the second input rises above that of the first input and its rising edge occurring at the timing the voltage level of the first input rises above that of the second input. The rising edge of the comparison output is used to generate the index signal.

According to the fourth embodiment of the present invention, the rising edge of the comparison output, namely the timing in the vicinity of the zero crossing point of the magnetic flux detected output of the magnetic flux detecting coil 3 is used. The zero crossing point of the magnetic flux detected output is insensitive to temperature even though the amplitude of the magnetic flux detected output is dependent on temperature. Thus, the generation timing of the index signal is free from variations even under ambient temperature changes.

Furthermore, according to the fourth embodiment of the present invention, the magnetic flux detected output from the magnetic flux detecting coil 3 contains the two peaks $P_1$, $P_2$ of the same polarity. Even if there is no substantial level difference between both peaks $P_1$, $P_2$, the generating timing of the index signal is free from an erratic shifting, because one peak $P_2$ is masked by the high-voltage level $V_1$ of the first input.

According to the first and second embodiments of the present invention, the timing of the transition point (zero crossing point) of the output of the Hall effect device remains unchanged regardless of varying ambient temperatures even when the amplitude of the output of the Hall effect device varies due to its temperature characteristics. If the zero crossing point is used to generate the index signal, the timing of the index signal is constant regardless of ambient temperature changes.

According to the third embodiment of the present invention, the magnetic flux detecting coil is used to detect magnetic flux of the double-pole magnet, the detected output of the magnetic flux detection coil suffers no variations even under ambient temperature changes and the generation timing of the index signal is maintained constant. Furthermore, since one of the two peaks of the same polarity of the detected output is masked by the mask voltage, the generating timing of the index signal is free from an erratic shifting even when the two peaks of the same polarity are at nearly the same level.

According to the fourth embodiment of the present invention, even if the amplitude of the detected output of the magnetic flux detecting device for detecting magnetic flux of the double-pole magnet varies under ambient temperature changes, the crossing point of the detected output with the sum of the output of the Hall effect device and the output of the feedback type comparator circuit is free from variations. The generation timing of an index signal is maintained constant. Furthermore, since one of the two peaks of the same polarity of the detected output is masked, the generating timing of the index signal is free from an erratic shifting even when the two peaks of the same polarity are at nearly the same level.

What is claimed is:

1. An index signal generating circuit comprising a magnet attached onto the circumference of the rotor of a spindle motor, a magnetic flux detecting device for detecting magnetic flux of the magnet when the magnet moves past the magnetic flux detecting device, a Hall effect device for switching a current in the driving coil of the spindle motor, a waveform shaping circuit for shaping the output of the Hall effect device into a rectangular-wave signal, and a feedback type comparator circuit for comparing the rectangular-wave signal fed from the waveform shaping circuit to a first input of the comparator circuit with the detected output of the magnetic flux detecting device fed to a second input of the comparator circuit to produce a comparison output, wherein the level of the detected output of the magnetic flux detecting device fed to the second input with no magnetic flux being detected is set to be lower than the negative polarity level of the rectangular-wave signal; the level of the detected output of the magnetic flux detecting device obtained during the negative polarity duration of the rectangular-wave signal is set to be higher than the negative polarity level of the rectangular-wave signal; and an index signal is generated based on the timing of a transition of the comparison output of the comparator; a transistor connected to switch the rectangular-wave signal that is periodically transitioned between a voltage level V1 and a voltage level V2 to the comparator circuit; a bias voltage power supply connected to superimpose a direct current voltage on the detected output of the magnetic flux detecting device such that the voltage level of the magnetic flux detecting device with no magnetic flux detected is lower than the two voltage levels V1 and V2 of the rectangular-wave signal and such that the voltage level of a positive going peak of the magnetic flux detecting device with a magnetic flux detected is between the two voltage levels V1 and V2.

* * * * *